United States Patent
Van Es et al.

(10) Patent No.: US 12,130,258 B2
(45) Date of Patent: Oct. 29, 2024

(54) ULTRASOUND SUB-SURFACE PROBE MICROSCOPY DEVICE AND CORRESPONDING METHOD

(71) Applicant: Nederlandse Organisatie voor toegepast-natuurwetenschappelijk onderzoek TNO, 's-Gravenhage (NL)

(72) Inventors: Maarten Hubertus Van Es, Voorschoten (NL); Paul Louis Maria Joseph Van Neer, Bergschenhoek (NL); Kodai Hatakeyama, Pijnacker (NL); Benoit Andre Jacques Quesson, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 339 days.

(21) Appl. No.: 17/613,746

(22) PCT Filed: May 26, 2020

(86) PCT No.: PCT/NL2020/050338
§ 371 (c)(1),
(2) Date: Nov. 23, 2021

(87) PCT Pub. No.: WO2020/242304
PCT Pub. Date: Dec. 3, 2020

(65) Prior Publication Data
US 2022/0236228 A1    Jul. 28, 2022

(30) Foreign Application Priority Data
May 27, 2019   (EP) ..................... 19176726

(51) Int. Cl.
*G01N 29/06* (2006.01)
*G01N 29/12* (2006.01)
(Continued)

(52) U.S. Cl.
CPC ......... *G01N 29/0681* (2013.01); *G01N 29/12* (2013.01); *G01N 29/2437* (2013.01);
(Continued)

(58) Field of Classification Search
CPC ........ G01N 29/00; G01N 29/04; G01N 29/06; G01N 29/0681; G01N 29/11; G01N 29/12;
(Continued)

(56) References Cited

U.S. PATENT DOCUMENTS

| | | | |
|---|---|---|---|
| 4,646,573 A | * | 3/1987 | Stoll ...................... G10K 11/30 |
| | | | 73/606 |
| 5,319,977 A | | 6/1994 | Quate et al. |

(Continued)

FOREIGN PATENT DOCUMENTS

| | | | | |
|---|---|---|---|---|
| CN | 107219379 A | * | 9/2017 | ......... G01N 29/0681 |
| EP | 3232192 A1 | | 10/2017 | |
| JP | 2014006177 A | * | 1/2014 | ............. G01N 29/11 |

OTHER PUBLICATIONS

Machine Translation of JP 2014006177 A (Year: 2014).*
(Continued)

*Primary Examiner* — Nguyen Q. Ha
(74) *Attorney, Agent, or Firm* — Leydig, Voit & Mayer, Ltd.

(57) ABSTRACT

An ultrasound sub-surface probe microscopy device (1) is provided comprising a stage (10), a signal generator (20), a scanning head (30), a signal processor (50) and a scanning mechanism (16). In use, the stage (10) carries a sample (11) and the scanning mechanism (16) provides for a relative displacement between the sample (11) and the scanning head (30), along the surface of the sample. The scanning head (30) comprises an actuator (31) configured to generate in response to a drive signal ($S_{dr}$) from the signal generator (Continued)

(20) an ultrasound acoustic input signal ($I_{ac}$). The generated ultrasound acoustic input signal ($I_{ac}$) has at least one acoustic input signal component ($I_{ac1}$) with a first angular frequency ($\omega 1$). The scanning head (30) further comprises a tip (32) to transmit the acoustic input signal ($I_{ac}$) through a tip-sample interface (12) as an acoustic wave ($W_{ac}$) into the sample. Due to a non-linear interaction in the tip-sample interface (12) at least one up mixed acoustic signal component ($W_{ac2}$) in said acoustic wave that has a second angular frequency ($\omega 2$) higher than the first angular frequency ($\omega 1$) Contrary to known approaches, the sensor signal ($S_{sense}$) provided by the sensor facility is indicative for a contribution ($W'_{ac2}$) of the at least one up mixed acoustic signal component in reflections ($W'_{ac}$) of the acoustic wave within the sample (11). Therewith a relatively high resolution can be achieved with which subsurface features can be detected.

20 Claims, 4 Drawing Sheets

(51) Int. Cl.

| | | |
|---|---|---|
| *G01N 29/24* | (2006.01) | |
| *G01N 29/26* | (2006.01) | |
| *G01N 29/34* | (2006.01) | |
| *G01N 29/44* | (2006.01) | |

(52) U.S. Cl.
CPC ............ *G01N 29/26* (2013.01); *G01N 29/348* (2013.01); *G01N 29/44* (2013.01); *G01N 2291/014* (2013.01); *G01N 2291/023* (2013.01)

(58) Field of Classification Search
CPC .... G01N 29/22; G01N 29/24; G01N 29/2437; G01N 29/26; G01N 29/34; G01N 29/348; G01N 29/44; G01N 2291/014; G01N 2291/023
See application file for complete search history.

(56) References Cited

U.S. PATENT DOCUMENTS

| | | | | |
|---|---|---|---|---|
| 6,560,005 | B2* | 5/2003 | Thomas | .................... G02F 1/33 |
| | | | | 359/305 |
| 7,360,404 | B2* | 4/2008 | Reinstadtler | ........... G01Q 60/28 |
| | | | | 73/105 |
| 7,798,001 | B2* | 9/2010 | Shekhawat | ........ G01N 29/0663 |
| | | | | 181/101 |
| 2008/0276695 | A1 | 11/2008 | Prater et al. | |
| 2008/0295584 | A1 | 12/2008 | Cantrell et al. | |
| 2015/0293144 | A1 | 10/2015 | Jesse et al. | |

OTHER PUBLICATIONS

Machine Translation of CN 107219379 A (Year: 2017).*
European Patent Office, International Search Report in corresponding International Application No. PCT/NL2020/050338, dated Aug. 11, 2020 (3 pages).
Baumann et al., "Dual Frequency Atomic Force Microscopy on Charged Surfaces," Ultramicroscopy, vol. 110, No. 6, pp. 578-581 (May 1, 2010) XP027064210.

* cited by examiner

ULTRASOUND SUB-SURFACE PROBE MICROSCOPY DEVICE AND CORRESPONDING METHOD

CROSS-REFERENCE TO RELATED APPLICATIONS

This patent application is a U.S. National Phase of PCT International Application No. PCT/NL2020/050338, filed May 26, 2020, which claims priority to European Application No. 19176726.8, filed May 27, 2019, which are both expressly incorporated by reference in their entireties, including any references contained therein.

The present invention relates to an ultrasound sub-surface probe microscopy device.

The present invention further relates to a corresponding improved method.

The wording "ultrasound" as used herein refers to sound in a frequency range of 1 GHz and higher.

In an ultrasound sub-surface probe microscopy device, for example as known from EP3232192, a transducer is used to apply an acoustic input signal to the sample, which induces acoustic waves into the sample. The induced acoustic waves reflect at features within the sample. A probe including a probe tip in contact with the surface of the sample is used to sense an acoustic output signal representative of these reflections. The sensed acoustic output signal can be processed to inspect sub-surface features of the sample. An ultrasound sub-surface probe microscopy device is known for example from EP3232192.

The resolution with which sub-surface features can be observed is proportional to the wavelength of the acoustic wave. Accordingly, it is desired to perform the measurement at a frequency that is as high as possible. To that end dedicated piezo transducers are developed for generating acoustic input signal in the 10 GHz to 100 GHz range. The highest frequency reported so far of a piezo transducers is 96 GHz. In practice, electronic components used in the transmission and reception chain may be different. For example, currently, state of the art arbitrary waveform generators cannot achieve the highest frequencies that theoretically could be used with piezo electric transducers. Therewith the electronic components used in the transmission and reception chain would form a bottleneck. Alternatively, in case of a substantial improvement in waveform generator technology without a corresponding improvement in transducer technology, the transducer would be a bottleneck. Accordingly, there is a need for measures that address such bottlenecks.

Reference is made further to the following documents.

BAUMANN et al.: "Dual frequency atomic force microscopy on charged surfaces", ULTRAMICROSCOPY, ELSEVIER, AMSTERDAM, NL, vol. 110, no. 6, 1 May 2010, pages 578-581, XP027064210, ISSN: 0304-3991, DOI: 10.1016/J.ULTRAMIC.2010.02.013

US 2015/293144 A1

US 2008/295584 A1

BAUMANN specifies a dual frequency atomic force microscopy applied on charged surfaces. In operation, the cantilever is mechanically driven at two resonant frequencies in a bimodal atomic force microscope (AFM). To generate the feedback signal for topography measurement the deflection signal is demodulated at one frequency and for compositional surface mapping at the other. In particular, the second mode amplitude and phase signals are used to map surface forces such as the van der Waals interaction. On electrically charged surfaces both, van der Waals forces and electrostatic forces contribute to the second eigenmode signal. The higher eigenmode signal in bimodal AFM reflects the local distribution of electrical charges.

US 2015/293144 A1 proposes application of a band excitation method in scanning probe microscopy. Therein a probe is simultaneously excited at a plurality of frequencies within a predetermined frequency band based on the excitation signal. A response of the probe is measured across a subset of frequencies of the predetermined frequency band and the excitation signal is adjusted based on the measured response.

US 2008/295584 A1 discloses a scanning probe microscope and methodology denoted as resonant difference-frequency atomic force ultrasonic microscopy (RDF-AFUM). The approach employs an ultrasonic wave launched from the bottom of a sample while the cantilever of an atomic force microscope, driven at a frequency differing from the ultrasonic frequency by one of the contact resonance frequencies of the cantilever, engages the sample top surface. The nonlinear mixing of the oscillating cantilever and the ultrasonic wave in the region defined by the cantilever tip-sample surface interaction force generates difference-frequency oscillations at the cantilever contact resonance. The resonance-enhanced difference-frequency signals are used to create images of nanoscale near-surface and subsurface features.

SUMMARY

It is an object of the present invention to provide means enabling a further improvement of the achievable resolution, signal-to-noise ratio or attenuation in an ultrasound sub-surface probe microscopy device.

In accordance therewith an improved ultrasound sub-surface probe microscopy device is provided.

In accordance therewith also a corresponding improved method is provided.

The improved ultrasound sub-surface probe microscopy device comprises a stage, a signal generator, a scanning head, a signal processor and a scanning mechanism.

In use, the stage carries a sample, the scanning head comprises an actuator that is configured to generate in response to a drive signal from the signal generator an acoustic input signal having at least one acoustic input signal component with a first angular frequency, and a tip to transmit the acoustic input signal through a tip-sample interface as an acoustic wave into the sample.

The tip-sample interface provides for a non-linear interaction resulting in at least one upmixed acoustic signal component, with a second angular frequency higher than said first angular frequency, in the acoustic wave.

The scanning head further comprising a sensor facility that in use provides a sensor signal that is indicative for a contribution of the at least one upmixed acoustic signal component in reflections of the acoustic wave within the sample. In use, the signal processor generates an image signal in response to the sensor signal and the scanning mechanism provides for a relative displacement between the sample and the scanning head, along the surface of the sample.

The inventors recognized, that even if there are practical limitations that restrict a further increase of the angular frequency of the acoustic input signal that can be achieved, a further improvement of the resolution, signal-to-noise ratio or attenuation optimization is possible by exploiting upmixed angular frequency components in the acoustic wave resulting from the non-linear tip-sample interaction.

Whereas, as such, the non-linear tip-sample interaction is not a new phenomenon, the improved ultrasound sub-surface probe microscopy device, exploits this phenomenon by specifically using the sensor facility to detect such upmixed angular frequency components.

Various embodiments are provided to achieve this.

In a first embodiment, the sensor facility of the scanning head has a sensor configured to directly sense the contribution of the at least one upmixed acoustic signal component in said reflections. In practice, it has been found feasible to detect such higher frequency acoustic signal components, even if it is not possible to directly generate them with an actuator. The signal processor may include a lock-in amplifier to lock in at a specific sensor signal component in the sensor signal as an indicator for the contribution of the upmixed acoustic signal component. Alternatively or additionally, the signal processor may apply one or more of boxcar averaging, peak detection, synchronous delay and other signal detection methods.

In a second embodiment, the sensor facility of the scanning head is configured to indirectly sense the contribution of the upmixed acoustic signal component in said reflections by downmixing the upmixed acoustic signal component in a non-linear tip-sample interaction with at least one auxiliary acoustic signal component to obtain a downmixed acoustic signal component with a third angular frequency lower than the second angular frequency. The contribution of the downmixed acoustic signal component, which is indicative for the contribution of the upmixed acoustic signal component in the reflected acoustic wave can then be sensed to render the sensed signal. This can for example be achieved with a piezo-electric element, using a lock-in amplifier to isolate the component in the sensed signal corresponding to the downmixed acoustic signal component. Alternatively, the angular frequency of the downmixed acoustic signal component may be configured to correspond to a contact resonance frequency of a cantilever, a membrane, or other flexible carrier, used to carry the tip with which the downmixed acoustic signal component is sensed and the sensor facility may comprise a sensor configured to sense a magnitude of resonance of the flexible carrier. This approach has the advantage that the flexible carrier provides for a specific sensitivity for the downmixed acoustic signal component to be sensed. This may obviate the need for signal processing means to isolate the component in the sense signal corresponding to the downmixed acoustic signal component. Various options are available to sense the magnitude of resonance. According to one option, a piezo-electric sensor is used for this purpose. According to another option, optical means are used to sense the resonance of the flexible carrier. Therewith the deflection of the flexible carrier is derived from the angle of reflection of an optical beam. This option is advantageous in that the measurement avoids a physical contact with the flexible carrier.

Although a non-linear interaction naturally occurs at a tip-sample interface, the improved ultrasound sub-surface probe microscopy device may additionally include elements to control the nature of this non-linearity, to therewith enhance the magnitude of the upmixed acoustic signal component in the acoustic wave. The properties of the non-linearity can be influenced by selecting the shape or material of the tip. Also a dynamic control of these properties is possible by controlling the pressure exerted by the tip on the sample surface. These settings may be further made dependent on the material of the sample. The additional elements to control the nature of the non-linearity may include a force-distance analytic module to perform a measurement for determining a relationship between a force exerted to the tip and a resulting sample-tip distance. Near a setpoint do for the distance d, selected for operation, the relationship can be approximated by $$F(d) = a_0 + a_1 * (d - d_0) + a_3 * (d - d_0)^3$$

Wherein $a_0 > 0$, $a_1 < 0$, $a_3 > 0$. Or $$F(d) = a_0 + a_2 * (d - d_0)^2$$

Wherein: $a_0 < 0$, $a_2 > 0$.

Therewith the nature of the non-linearity can be controlled by a proper selection of the set-point $d_0$.

In an embodiment, the ultrasound sub-surface probe microscopy device may be operated in a continuous mode, wherein the transmission tip transmits the ultrasound wavefront continuously while scanning the sample. This is favorable for a high scanning speed, Alternatively, the ultrasound acoustic microscopy device may be operated in a pulsed mode, wherein the transmission tip transmits the ultrasound wavefront as mutually distinct pulses. In this way disturbance of the detected signal by other acoustic signals not resulting from reflections in the sample, e.g. conducted along the surface of the sample is avoided.

The improved ultrasound sub-surface probe acoustic microscopy method comprises the following steps.

carrying a sample;

generating a drive signal;

generating in response to said drive signal an acoustic input signal having at least one component with a first angular frequency and using a non-linear tip-sample interaction to transmit the acoustic input signal as an acoustic wave into the sample at a contact position on the sample, the acoustic wave having at least one upmixed acoustic signal component of a second angular frequency higher than said first angular frequency as a result of said non-linear interaction;

providing a sensor signal indicative for a contribution of the at least one upmixed acoustic signal component in reflections of the acoustic wave within the sample;

generating an image signal in response to the sensor signal and;

displacing the contact position along the surface of the sample.

Post-processing may be applied to the image signal. Post-processing may for example include one or more of extracting critical dimensions, computing an accuracy with which specified dimensions are complied with, and computing an accuracy with which elements in mutually different layers are overlaid.

Prior to displacing the contact position along the surface of the sample, i.e. actually scanning the sample, an optimization step is performed, wherein a property of the drive signal is configured for optimizing a property of the sensed signal. The configuration of the drive signal may involve determining a number of signal components to be combined in the drive signal, and determining one or more of an amplitude, an angular frequency and a phase for one or more of these signal components. The sample may for example include a test pattern which is used in this preparatory mode of operation to configure the drive signal for optimization of image resolution, optimization of a signal to noise ratio (SNR) or minimization of an attenuation.

BRIEF DESCRIPTION OF THE DRAWINGS

These and other aspects are illustrated in more detail with reference to the drawings. Therein.

DETAILED DESCRIPTION OF EMBODIMENTS

Like reference symbols in the various drawings indicate like elements unless otherwise indicated.

Figure 1:
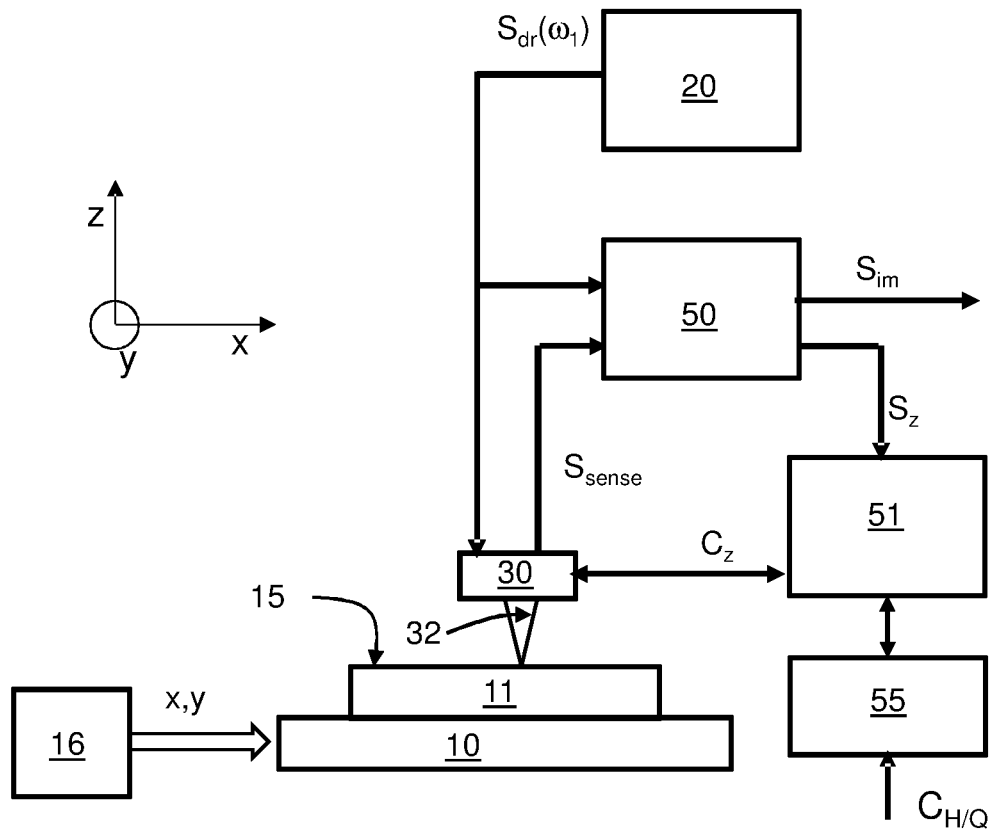
FIG. 1 schematically shows an embodiment of an ultrasound sub-surface probe microscopy device according to the present disclosure.

FIG. 1 schematically shows an ultrasound sub-surface probe microscopy device 1 according to the present disclosure. The improved ultrasound sub-surface probe microscopy device comprises a stage 10, a signal generator 20, a scanning head 30, a signal processor 50 and a scanning mechanism 16. In use, the stage 10 carries a sample 11 and a scanning mechanism 16 provides for a relative displacement between the sample 11 and the scanning head 30, along the surface of the sample. As shown in FIG. 1, the scanning mechanism 16 may therewith hold the scanning head 30 at a fixed position with respect to the reference frame, while displacing the stage 10 with the sample 11. Alternatively, the scanning mechanism 16 may therewith hold the stage 10 with the sample 11 at a fixed position with respect to a reference frame, while displacing the scanning head 30. As a further alternative, the scanning mechanism 16 may displace the stage 10 with the sample 11, for example in the x-direction, as well as the scanning head 30, for example in the y-direction, with respect to the reference frame.

Figure 2:
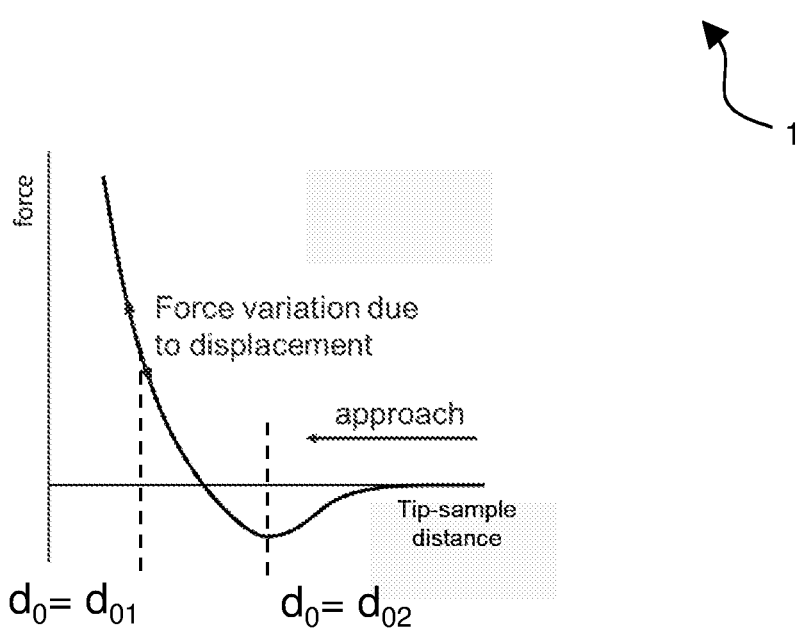
FIG. 2 illustrates a non-linearity at a tip-sample interface.
Figure 1A:
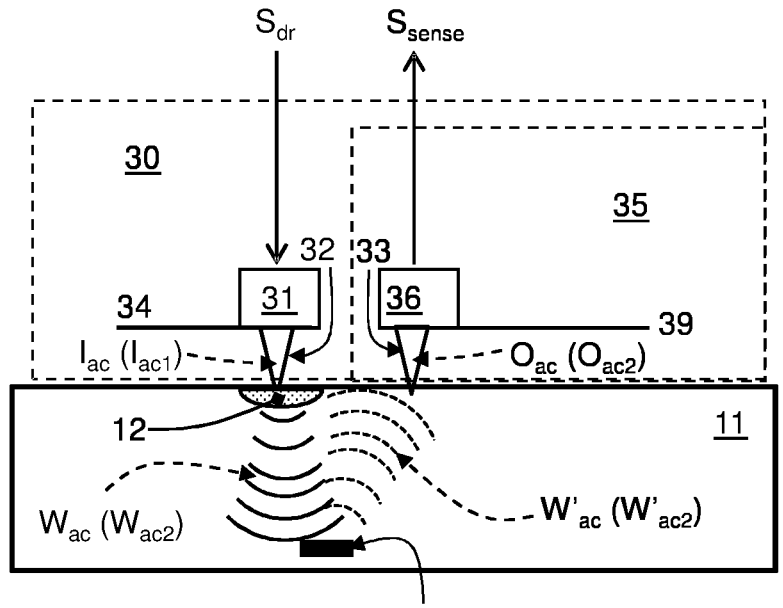
FIG. 1A, shows an embodiment of a scanning head for use in an ultrasound sub-surface probe microscopy device according to the present disclosure.

As shown in more detail in FIG. 1A, the scanning head 30 comprises an actuator 31 arranged at flexible carrier 34, e.g. a cantilever, with tip 32, that is configured to generate in response to a drive signal $S_{dr}$ from the signal generator 20 an ultrasound acoustic input signal $I_{ac}$. The generated ultrasound acoustic input signal $I_{ac}$ has at least one acoustic input signal component $I_{ac1}$, with a first angular frequency $\omega 1$. The scanning head 30 further comprises a tip 32 to transmit the acoustic input signal $I_{ac}$ through a tip-sample interface 12 as an acoustic wave $W_{ac}$ into the sample. As shown in FIG. 2, the force (vertical axis) exerted by the tip 32 on the sample 11 in the tip-sample interface 12 is non-linearly related to the distance (horizontal axis) between the tip and the sample.

This non-linear interaction results in at least one upmixed acoustic signal component $W_{ac2}$ in said acoustic wave that has a second angular frequency $\omega 2$ higher than the first angular frequency $\omega 1$.

In operation, the acoustic wave $W_{ac}$ propagates through the sample 11, and may reflect at sub-surface features 13 to be detected within the sample. The sub-surface features 13 may for example be structures in a lower arranged layer in a multilayer semiconductor device, with which features in a next semiconductor layer are to be aligned. A sub-surface feature in the lower arranged layer may for example be an electronic functional feature, e.g. a conductor or it may be a separate alignment mark. The scanning head 30 further comprises a sensor facility 35 to provide a sensor signal $S_{sense}$. Contrary to known approaches, the sensor signal $S_{sense}$ provided by the sensor facility is indicative for a contribution of the at least one upmixed acoustic signal component in reflections $W'_{ac}$ of the acoustic wave within the sample 11. The contribution of the at least one upmixed acoustic signal component, having a second angular frequency $\omega 2$ higher than the first angular frequency $\omega 1$ enables detection with a higher resolution than the resolution that could be achieved when sensing an acoustic signal component at the first angular frequency $\omega 1$, corresponding to the frequency of the acoustic input signal $I_{ac}$ generated with the actuator 31. The signal processor 50 is to generate an image signal Sim in response to the sensor signal $S_{sense}$. It is noted that the wording "image" used in "image signal" is to be interpreted according to the mathematical definition, i.e. the image signal is a function of the sensor signal. The image signal is indicative of observed features in the sample. The image signal may correspond to a two-dimensional image of those features, but may alternatively represent another type of image, e.g. a 1 dimensional image showing a height profile of those features along a scanning direction, or a higher dimensional image, e.g. a moving image having the time as a coordinate in addition to one or more spatial coordinates.

In practice, electronic components used in the transmission and reception chain may be different. For example, currently, state of the art arbitrary waveform generators cannot achieve the highest frequencies that theoretically could be used with piezo electric transducers. Therewith the electronic components used in the transmission and reception chain would form a bottleneck. Alternatively, in case of a substantial improvement in waveform generator technology without a corresponding improvement in transducer technology, the transducer would be a bottleneck. The present disclosure provides solutions to such restrictions.

In the embodiment of FIG. 1A, the sensor facility 35 of the scanning head 30 has a sensor 36 arranged at cantilever 39 with sensing tip 33. The sensor 36 in this embodiment is configured to directly sense the contribution $W'_{ac2}$ of the at least one upmixed acoustic signal component in the reflections. The signal processor 50 may include a lock-in amplifier to lock in at the specific sensor signal component in the sensor signal $S_{sense}$ as the indicator for the contribution $W'_{ac2}$ of the at least one upmixed acoustic signal component, i.e. a lock-in amplifier tuned to the second angular frequency $\omega 2$ of the at least one upmixed acoustic signal component.

Figure 1B:
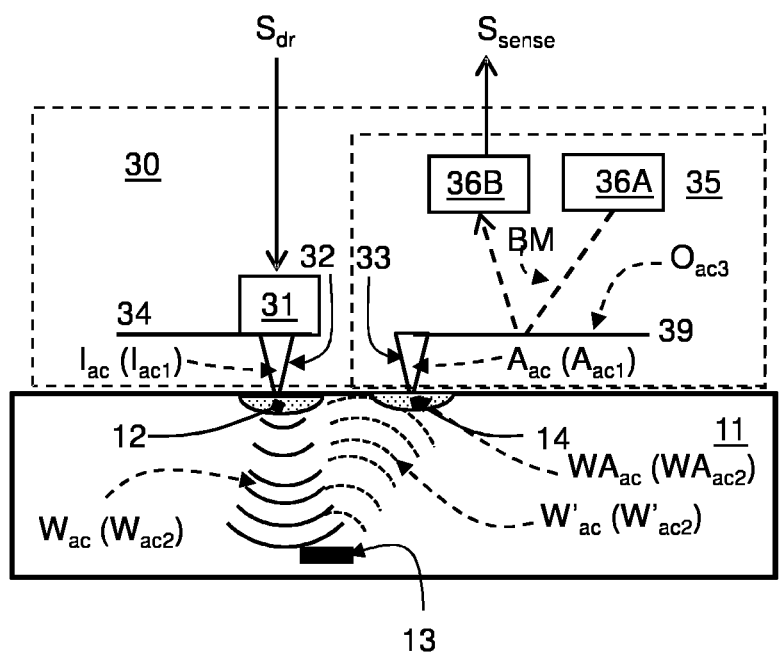
FIG. 1B, shows another embodiment of a scanning head for use in an ultrasound sub-surface probe microscopy device according to the present disclosure.

In the embodiment of FIG. 1B, the sensor facility 35 provides for a further non-linear tip-sample interaction in the further tip-sample interface 14 between tip 33 and sample 11. The further non-linear tip-sample interaction in the further tip-sample interface 14 provides for a downmixing of the at least one upmixed acoustic signal component with another upmixed acoustic signal component originating from the non-linear tip-sample interaction in the tip-sample interface 12. This downmixing results in at least one downmixed acoustic signal component $O_{ac3}$ with a third angular frequency $\omega 3$ lower than the second angular frequency $\omega 2$.

Therewith the sensor facility 35 of the scanning head 30 is configured to indirectly sense the contribution $W'_{ac2}$ of the at least one upmixed acoustic signal component by sensing the at least one downmixed acoustic signal component $O_{ac3}$. In this embodiment the third angular frequency ω3 of the downmixed acoustic signal component $O_{ac3}$ corresponds to a contact resonance frequency of a flexible carrier, here a cantilever 39 used to carry the tip 33 for sensing. This can be achieved by measuring the contact resonance frequency and then tuning the input signal $S_{dr}$ so that the downmixed signal matches this value.

Furthermore, the sensor facility 35 comprises a sensor 36B configured to sense a magnitude of resonance of the cantilever 39. In the embodiment shown, the sensor 36B is an optical sensor that measures a deflection of a laser beam BM generated by a laser 36A and reflected at the cantilever 39. Alternatively an acoustic sensor, e.g. formed by a piezo-electric element may be coupled to the cantilever 39 and may be used to sense the downmixed acoustic signal component $O_{ac3}$ as the component indicative for a contribution $W'_{ac2}$ of the at least one upmixed acoustic signal component in reflections W'ac of the acoustic wave within the sample.

Alternatively, the sensor facility 35 of the scanning head 30 may be configured to sense a downmixed signal component at a frequency differing from the contact resonance frequency of the flexible carrier. However, by selecting a frequency of the signal to be sensed that corresponds to the contact resonance frequency of the flexible carrier, the flexible carrier serves as a filter that selectively improves the sensitivity for the downmixed component to be sensed.

Whereas the improved microscopy device may be used to locate deliberately formed subsurface features, e.g. to enable alignment of other features therewith, it may also be used to detect any undesired subsurface features, like dust particles, e.g. for a product quality check.

In the embodiments shown in FIGS. 1A and 1B, separate facilities are provided for acoustic signal generation and sensing. This has the advantage that the elements used in these facilities can be optimized separately for each of these functions. For example, the shape of the tip 32 and the cantilever 34 as well as the contact pressure exerted by the tip 32 can be selected to maximize the amplitude of the at least one upmixed acoustic signal component $W_{ac2}$ in the acoustic wave Way. Likewise the shape of the tip 33 and the cantilever 39 as well as the contact pressure exerted by the tip 33 can be selected to optimize sensing. Alternatively, however it may be contemplated to use one or more elements in common, for example a scanning head may be provided with a single flexible tipped carrier for transmitting the input acoustic signal and for sensing acoustic signal component(s) indicative for the contributions of $W'_{ac2}$ of the at least one upmixed acoustic signal component in reflections $W'_{ac}$ of the acoustic wave within the sample. The acoustic input signal $S_{ac}$ generated with the actuator 31 may be either a continuous signal or a pulse signal. An advantage of using a continuous input signal is that it enables a higher throughput. An advantage of a pulse-wise operation is that it facilitates signal analysis. This is particularly the case for scanning arrangements using shared means for transmitting and receiving acoustic signals. In that case sensing can take place between subsequent pulses of the acoustic input signal $S_{ac}$.

Several options are available to control the generation of the at least one upmixed acoustic signal component $W_{ac2}$ in the acoustic wave $W_{ac}$. This depends for example on the shape of the tip 32. The nature of the non-linear relationship can further be controlled dynamically by setting the average contact pressure. In the embodiment of FIG. 1, the average contact-pressure is maintained at a predetermined value by a servo-system, comprising a driver 51 and a z-actuator (not shown) that positions the scanning head 30 in the z-direction with respect to the surface 15 of the sample 11.

In the embodiment shown in FIG. 1, the microscopy device 1 comprises a force-distance analytic module 55 to perform a measurement for determining a relationship between a force F exerted to the tip and a resulting sample-tip distance d. Near a setpoint do for the distance d, selected for operation, the relationship can be approximated by $$F(d) = a_0 + a_1 * (d - d_0) + a_3 * (d - d_0)^3$$

Wherein $a_0>0$, $a_1<0$, $a_3>0$. Or $$F(d) = a_0 + a_2 * (d - d_0)^2$$

Wherein: $a_0<0$, $a_2>0$.

Therewith the nature of the non-linearity can be controlled by a proper selection of the set-point $d_0$.

Subsequent to a determination of the force-distance relationship, the operator provide a control signal $C_{H/Q}$ to the force-distance analytic module 55 to specify a desired type of non-linearity, for example Hertzian or Quadratic and the force-distance analytic module 55 determines which set-point for the distance d is required to achieve the required non-linearity. For example, if a Hertzian non-linearity is specified it may determine $d_0=d_{01}$ as the set-point, and if a Quadratic non-linearity is required, it may determine $d_0=d_{02}$ as the set-point.

The signal processor 50 issues an input signal $S_z$ to the driver 51 indicative of a measured contact pressure and the driver 51 provides a control signal $C_z$ to the z-actuator to maintain the measured contact pressure close to a value required for a particular non-linear behavior in the tip-sample interface 12 in accordance with the specification by the force-distance analytic module 55.

In an exemplary mode of operation, the non-linear relationship between distance and force is of a quadratic nature. The acoustic input signal $I_{ac}$ may comprise a first acoustic input signal component $I_{ac1}$ having an angular frequency ω1. Due to the quadratic relationship, the acoustic wave $W_{ac}$ can be written as $$Wac = \alpha \cdot (\sin(\omega_1 \cdot t)^2 = 1/2(1 - \cos(2\omega_1 \cdot t),$$

wherein α is a constant.

Accordingly, the acoustic wave $W_{ac}$ includes an upmixed acoustic signal component $W_{ac2}$ with an angular frequency double that of the component provided as the acoustic input signal.

Figure 3A:
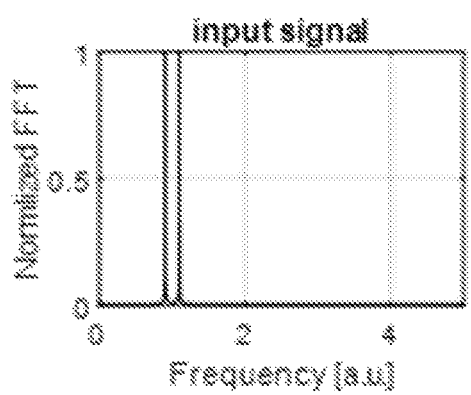
FIGS. 3A, 3B and 3C respectively show components of an acoustic input signal, components of an acoustic wave formed in a quadratic type tip-sample interface, and components of an acoustic wave formed in a Hertzian type tip-sample interface.
Figure 3B:
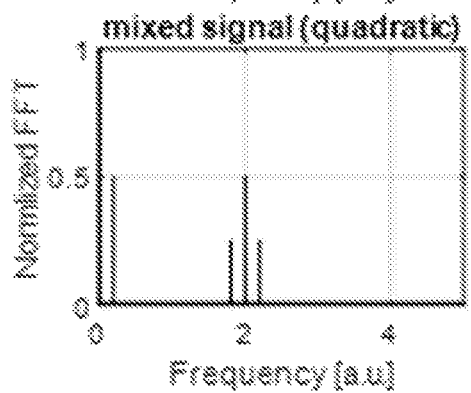

The acoustic input signal $I_{ac}$ may include more components to therewith further change the properties of the acoustic wave. For example, as shown in FIG. 3A, the acoustic input signal $I_{ac}$ may comprise a first acoustic input signal component $I_{ac1}$ having an angular frequency ω1 and a second acoustic input signal component $I_{ac2}$ having an angular frequency $\omega_2$ with $\omega_2<<\omega1$. The input signal is defined as the multiplication of the two input components signals $I_{ac1}$ and $I_{ac}=I_{ac1}\times I_{ac2}$. In that case, as shown in FIG. 3B, the input signal $I_{ac}$ consists of the two input angular frequencies $\omega_1-\omega_2$ and $\omega_1+\omega_2$, the acoustic wave $W_{ac}$ from the tip-sample interface with quadratic behavior comprises upmixed components with an angular frequency of $2\omega_1$, $2(\omega_1-\omega_2)$, $2(\omega_1+\omega_2)$, as well as aDC component ($\omega=0$) and a downmixed component $2\,\omega_2$.

In another exemplary mode of operation, the non-linear relationship between distance d and force F is characterized as Hertzian, wherein variations $\Delta F$ in the force F are approximately related to variations $\Delta d$ in the distance d as $$\Delta F=\beta(\Delta d)^{1.5}, \text{ wherein } \beta \text{ is a constant.}$$

Figure 3C:
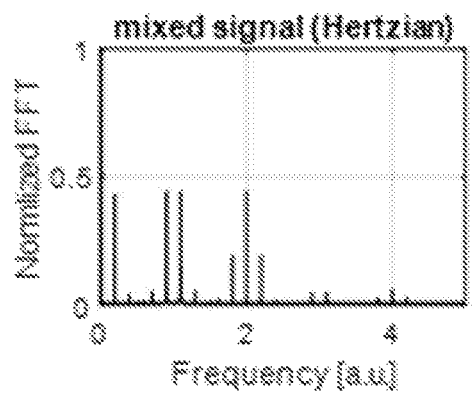

In this case acoustic wave $W_{ac}$ with a rich spectrum is achieved with also includes acoustic components having substantially higher frequencies, as is shown in FIG. 3C.

Accordingly, by generating the acoustic input signal $I_{ac}$ with one, two or more acoustic signal components, and controlling the nature of the non-linear interaction in the tip-sample interface, the spectrum of the acoustic wave $W_{ac}$ can be shaped as desired. Moreover properties of the acoustic signal components can be controlled, for example including their amplitude, their angular frequency and their relative phases.

According to one approach, a simulation can be performed. For example such a simulation may be performed as a brute-force approach to determine which from all possible combinations maximizes the desired upmixed component (performance metrics can be amplitude, SNR, amplitude of other components in a given bandwidth). Known optimization techniques may be used to converge faster. Also certain boundary requirements may be specified, for example the requirement that the frequencies of the involved components are at least $\frac{1}{10}^{th}$ the angular frequency of the desired component.

Figure 4:
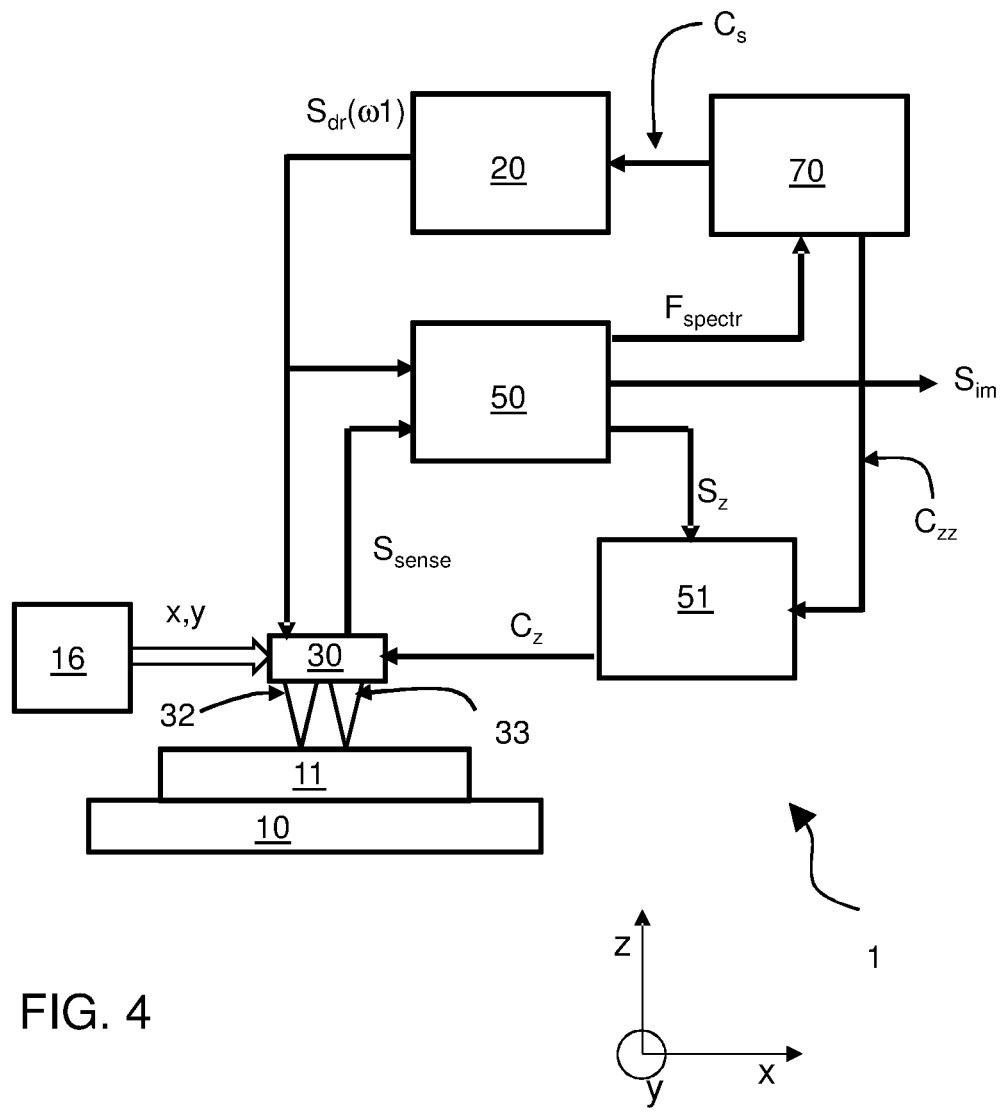
FIG. 4 schematically shows another embodiment of an ultrasound sub-surface probe microscopy device according to the present disclosure.

In the embodiment of the microcopy device shown in FIG. 4, a feedback unit 70 is provided. The feedback unit 70 receives a feedback signal $F_{spectr}$, that is indicative of a property of the sense signal $S_{sense}$. The sensed property as indicated with the feedback signal $F_{spectr}$ is for example a magnitude of a contribution of the at least one upmixed acoustic signal component $W_{ac2}$ that is sensed directly or indirectly with the sense signal $S_{sense}$. Based on the a feedback signal $F_{spectr}$, the feedback unit 70 controls the signal generator 20 with a control signal $C_s$. The feedback unit 70 may therewith control the signal generator to generate the drive signal $S_{dr}$ with a particular number of signal components, and/or control properties of one or more of these components, such as their amplitude, their angular frequency and their mutual phase relationship. In the embodiment shown, the feedback unit 70 further controls a property of the non-linear transmission at the tip-sample interface 12 by controlling with signal $C_{zz}$ a set point force exerted by the transmitter tip 32 to the sample 11.

The feedback unit 70 may for example operate as follows:
Prepare a first input pulse based simulation, given tip, sample parameters
Quickly iterate close to the optimum pulse in the feedback unit to ensure that the signal amplitude is always maximal.

The iteration preferably continues during operation of the microscope, preferably for each scanning point to adapt to changes in the surface of the sample along the x/y scanning trajectory.

The feedback unit 70 may have one or more of the following potential operational modes:
A first operational mode to optimize imaging resolution;
A second operational mode to optimize a signal to noise ratio (SNR);
A third operational mode to minimize an attenuation;

The feedback unit 70 may further be configured to operate dependending on an input signal indicative for a property of the sample. The input signal may for example be provided by an operator or may be obtained from measurements.

A method for operating an ultrasound sub-surface probe microscopy device 1, for example as shown in FIG. 1, 1A, 1B and/or FIG. 4 may comprise the following steps:
carrying a sample 11;
generating a drive signal $S_{dr}$;
generating in response to said drive signal $S_{dr}$ an ultrasound acoustic input signal $I_{ac}$ having at least one acoustic component $I_{ac1}$, with a first angular frequency and using a non-linear tip-sample interaction to transmit the acoustic input signal $I_{ac}$ as an acoustic wave $W_{ac}$ into the sample 11 at a contact position on the sample, the acoustic wave $W_{ac}$ having at least one upmixed acoustic signal component $W_{ac2}$ of a second angular frequency higher than said first angular frequency as a result of said non-linear interaction;
providing a sensor signal $S_{sense}$ indicative for a contribution $W'_{ac2}$ of the at least one upmixed acoustic signal component in reflections of the acoustic wave within the sample;
generating an image signal Sim in response to the sensor signal $S_{sense}$ and;
displacing the contact position along the surface of the sample.

The exemplary method may further comprise the step of post processing the image signal. For example, said post-processing may include one or more of extracting critical dimensions, computing an accuracy with which specified dimensions are complied with, computing an accuracy with which elements in mutually different layers are overlaid.

The method may comprise a preliminary step, wherein a property of the drive signal $S_{dr}$ is configured for optimizing a property of the sensor signal at a fixed contact position of the sample, for example at a location of predetermined marking provided as a subsurface feature in the sample. Also an optimal reference value for the contact pressure may be determined in this preliminary step. A feedback unit 70 may be used for this purpose. After this preliminary step, the actual scanning process may start with the settings determined in the preliminary step.

While the present invention has been described with respect to a limited number of embodiments, those skilled in the art will appreciate numerous modifications and variations therefrom within the scope of this present invention as determined by the appended claims. Therein the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. An ultrasound sub-surface probe microscopy device comprising:
a stage for carrying a sample;
a signal generator to generate a drive signal;
a scanning head comprising:
an actuator configured to generate, in response to the drive signal, an ultrasound acoustic input signal having at least one acoustic input signal component with a first angular frequency, and a tip to transmit the acoustic input signal through a tip-sample interface as an acoustic wave into the sample, wherein the tip-sample interface provides for a non-linear interaction resulting in at least one upmixed acoustic signal component in the acoustic wave having a second angular frequency higher than the first angular frequency; and a scanning mechanism to provide for a relative displacement between the sample and the scanning head, along the surface of the sample, wherein the scanning head further comprises a sensor facility to provide a sensor signal that is indicative for a contribution of the at least one upmixed acoustic signal component in reflections of the acoustic wave within the sample, and wherein the ultrasound sub-surface probe microscopy device further comprises:

a signal processor to generate an image signal in response to the sensor signal.

2. The ultrasound sub-surface probe microscopy device according to claim 1, wherein the signal processor includes a lock-in amplifier to lock in at a specific sensor signal component in the sensor signal as an indicator for the contribution of the at least one upmixed acoustic signal component.

3. The ultrasound sub-surface probe microscopy device according to claim 2, wherein the sensor facility of the scanning head has a sensor configured to directly sense the contribution of the at least one upmixed acoustic signal component in the reflections.

4. The ultrasound sub-surface probe microscopy device according to claim 1, wherein the sensor facility of the scanning head has a sensor configured to directly sense the contribution of the at least one upmixed acoustic signal component in the reflections.

5. The ultrasound sub-surface probe microscopy device according to claim 1, wherein the sensor facility of the scanning head is configured to indirectly sense the contribution of the at least one upmixed acoustic signal component in the reflections of the acoustic wave within the sample by downmixing the at least one upmixed acoustic signal component in a non-linear tip-sample interaction to at least one downmixed acoustic signal component with a third angular frequency lower than the second angular frequency.

6. The ultrasound sub-surface probe microscopy device according to claim 5, wherein the sensor facility comprises an acoustic sensor to sense the downmixed signal component.

7. The ultrasound sub-surface probe microscopy device according to claim 5, wherein the angular frequency of the downmixed signal component corresponds to a contact resonance frequency of a flexible carrier used to carry a tip for sensing, wherein the sensor facility comprises a sensor configured to sense a magnitude of resonance of the flexible carrier.

8. The ultrasound sub-surface probe microscopy device according to claim 7, comprising a piezo-electric sensor to sense the magnitude of resonance of the flexible carrier.

9. The ultrasound sub-surface probe microscopy device according to claim 7, comprising an optical arrangement configured to derive the magnitude of resonance of the flexible carrier by detecting an angle of reflection of an optical beam.

10. The ultrasound sub-surface probe microscopy device according to claim 1, wherein the acoustic input signal is a continuous signal.

11. The ultrasound sub-surface probe microscopy device according to claim 1, wherein the acoustic input signal is a pulse signal.

12. The ultrasound sub-surface probe microscopy device according to claim 1, comprising: a feedback unit to control the signal generator, and/or a force-distance analytic module to control a property of the non-linear transmission by controlling a set point force exerted by the tip to the sample.

13. The ultrasound sub-surface probe microscopy device according to claim 12, wherein the signal generator is configured to generate the drive signal with a number of signal components, and wherein the feedback unit is configured to:
control the number of signal components, and/or
properties of one or more of the components, the properties including one or more of the group consisting of: an amplitude, an angular frequency and a phase.

14. The ultrasound sub-surface probe microscopy device according to claim 13, wherein the feedback unit has one or more operational modes taken from the group consisting of:
a first operational mode to optimize imaging resolution;
a second operational mode to optimize a signal to noise ratio (SNR); and
a third operational mode to minimize an attenuation.

15. The ultrasound sub-surface probe microscopy device according to claim 12, wherein the feedback unit is configured to operate dependent on an input signal indicative of a property of the sample.

16. A method for operating an ultrasound sub-surface probe microscopy device comprising:
carrying a sample;
generating a drive signal;
generating, in response to the drive signal, an ultrasound acoustic input signal having at least one acoustic component with a first angular frequency and using a non-linear tip-sample interaction to transmit the acoustic input signal as an acoustic wave into the sample at a contact position on the sample, wherein the acoustic wave has at least one upmixed acoustic signal component of a second angular frequency higher than the first angular frequency as a result of the non-linear interaction;
displacing the contact position along the surface of the sample;
providing a sensor signal indicative of a contribution of the at least one upmixed acoustic signal component in reflections of the acoustic wave within the sample; and
generating an image signal in response to the sensor signal.

17. The method according to claim 16, further comprising the step of post processing the image signal, the post-processing including one or more of the group consisting of:
extracting critical dimensions,
computing an accuracy with which specified dimensions are complied with, and
computing an accuracy with which elements in mutually different layers are overlaid.

18. The method according to claim 16, wherein prior to displacing the contact position along the surface of the sample, an operation is performed to configure a property of the drive signal for improving a property of the sensor signal.

19. The method according to claim 16, comprising indirectly sensing the contribution of the at least one upmixed acoustic signal component in the reflections by downmixing the at least one upmixed acoustic signal component in a non-linear tip-sample interaction to at least one downmixed acoustic signal component with a third angular frequency lower than the second angular frequency.

20. The method according to claim 19, wherein the third angular frequency of the downmixed acoustic signal component corresponds to a contact resonance frequency of a flexible carrier.

* * * * *